Oct. 15, 1940.  E. E. KLEINSCHMIDT  2,218,113
PNEUMATIC PRINTER
Filed June 18, 1937  10 Sheets-Sheet 1

INVENTOR
EDWARD E. KLEINSCHMIDT
BY H.B. Whitfield
ATTORNEY

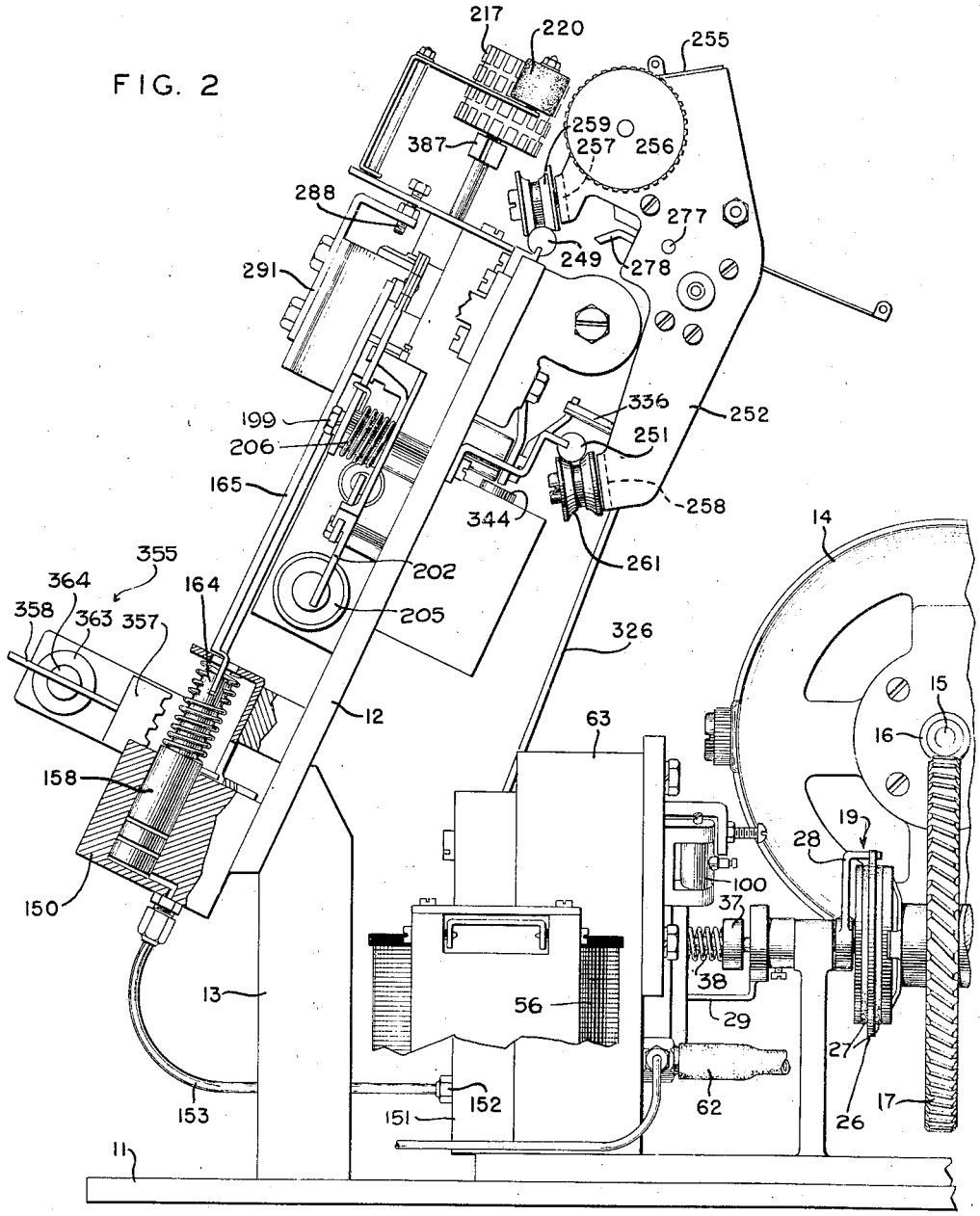

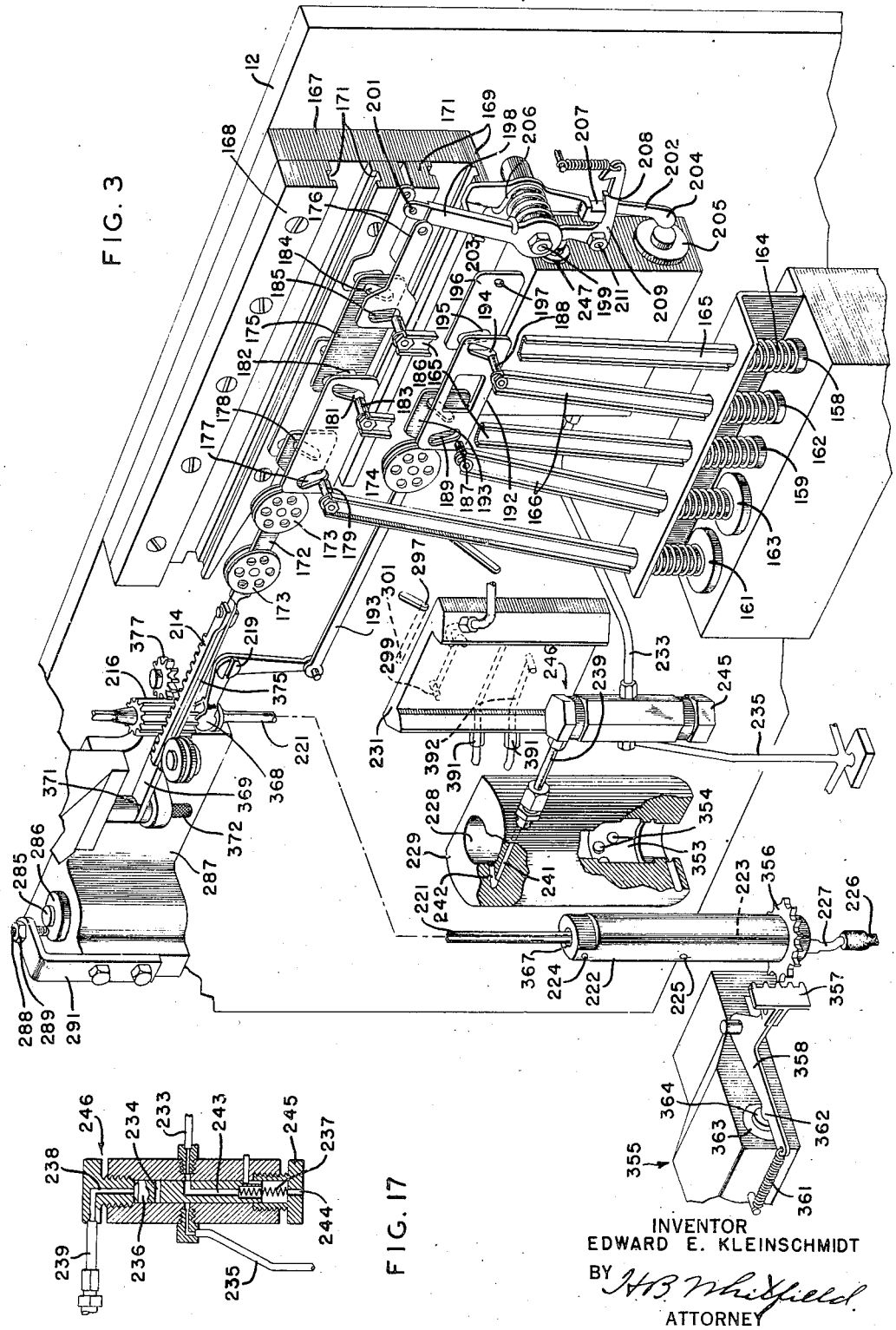

Oct. 15, 1940.　　　E. E. KLEINSCHMIDT　　　2,218,113
PNEUMATIC PRINTER
Filed June 18, 1937　　　10 Sheets-Sheet 4
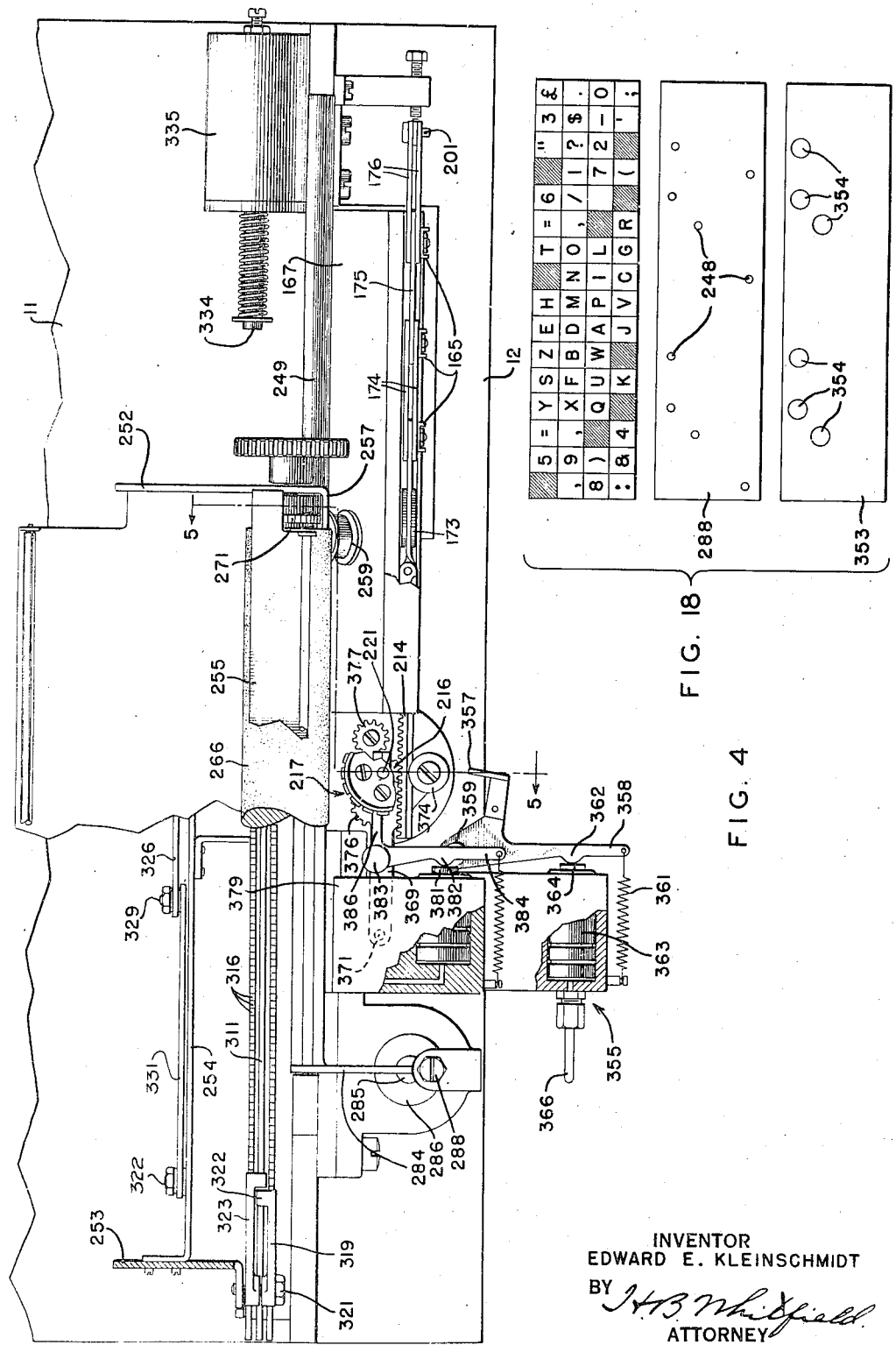
INVENTOR
EDWARD E. KLEINSCHMIDT
BY
ATTORNEY

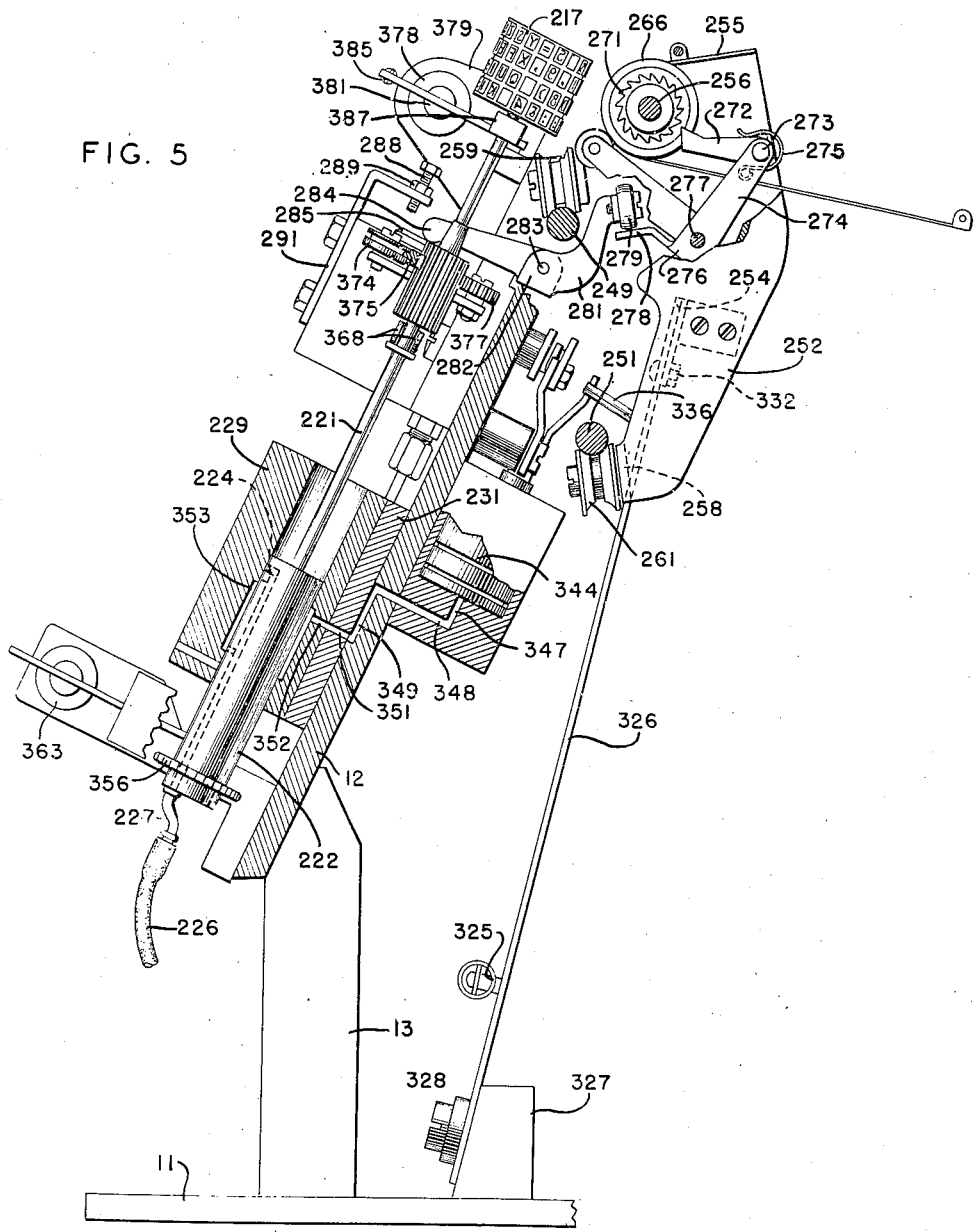

Oct. 15, 1940.  E. E. KLEINSCHMIDT  2,218,113
PNEUMATIC PRINTER
Filed June 18, 1937     10 Sheets-Sheet 6
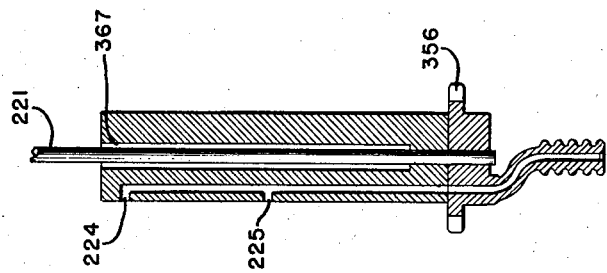
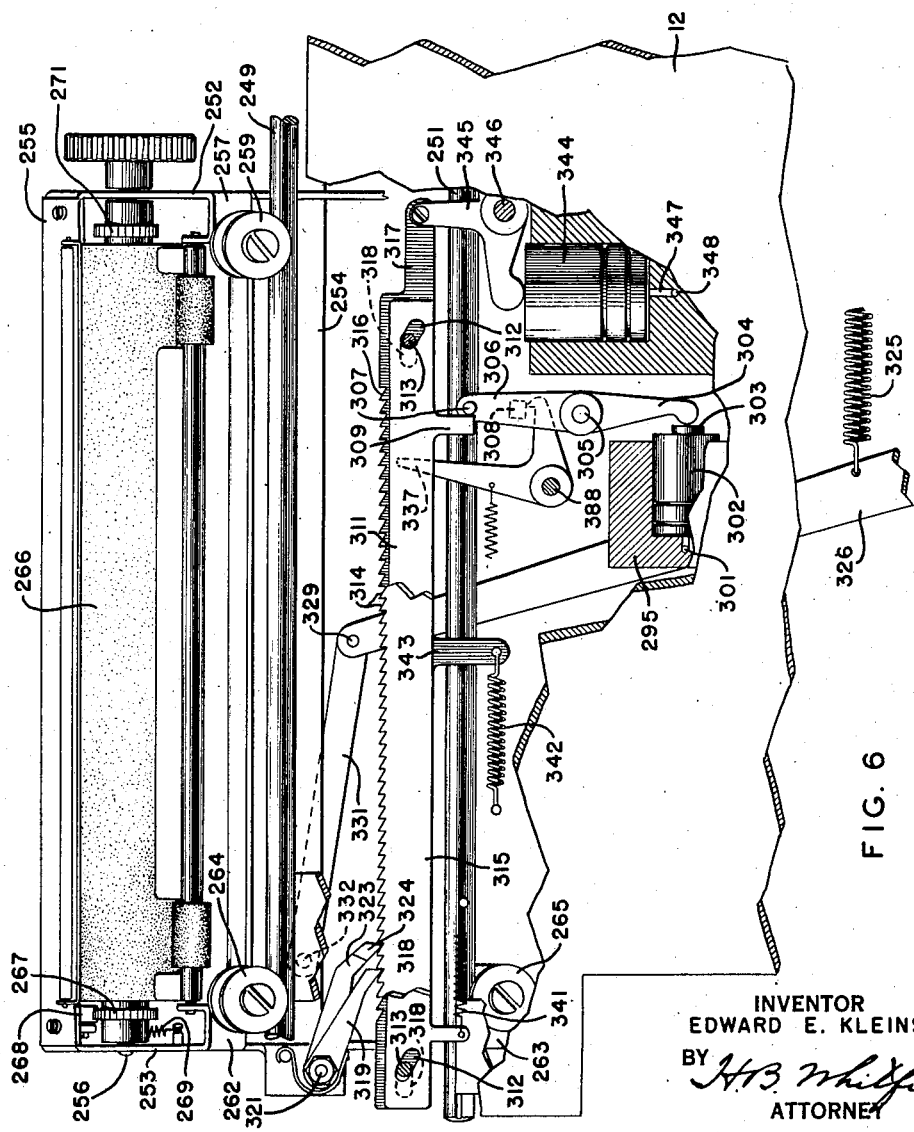
INVENTOR
EDWARD E. KLEINSCHMIDT
BY H. B. Whitfield
ATTORNEY Oct. 15, 1940.　　E. E. KLEINSCHMIDT　　2,218,113
PNEUMATIC PRINTER
Filed June 18, 1937　　10 Sheets-Sheet 7
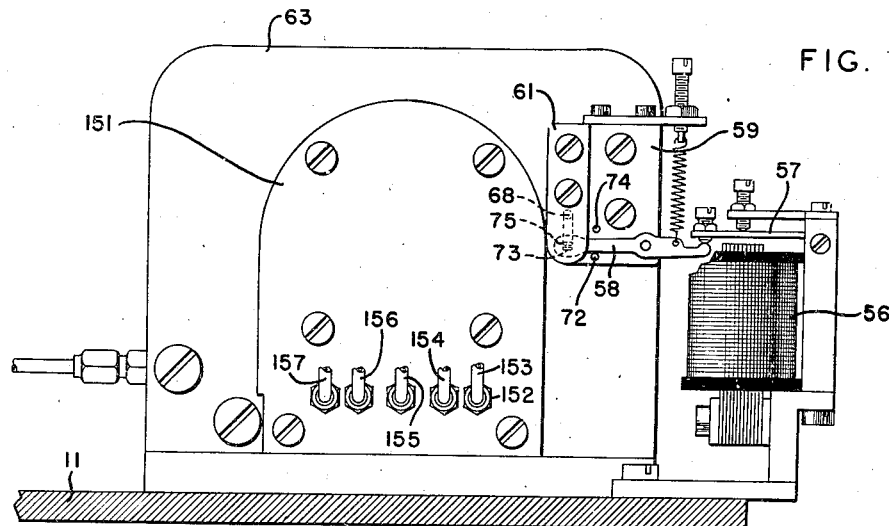
FIG. 7
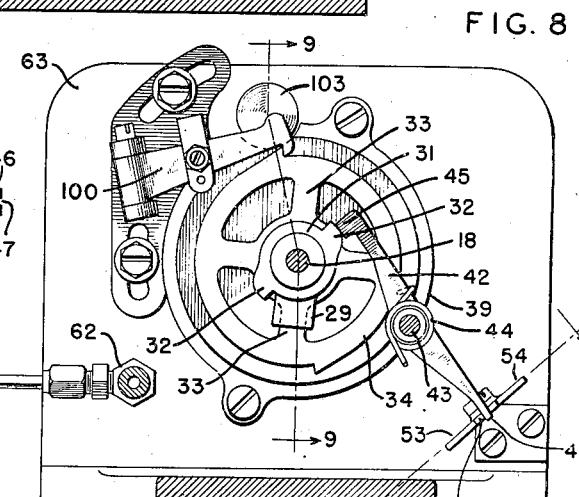
FIG. 8
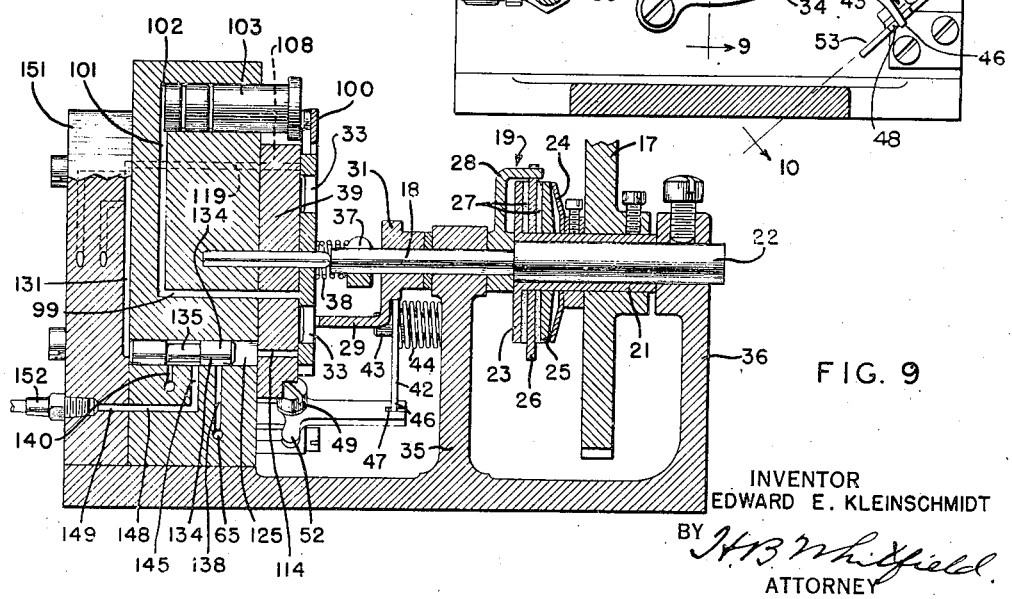
FIG. 10
FIG. 9
INVENTOR
EDWARD E. KLEINSCHMIDT
BY
ATTORNEY Oct. 15, 1940.  E. E. KLEINSCHMIDT  2,218,113
PNEUMATIC PRINTER
Filed June 18, 1937  10 Sheets-Sheet 8
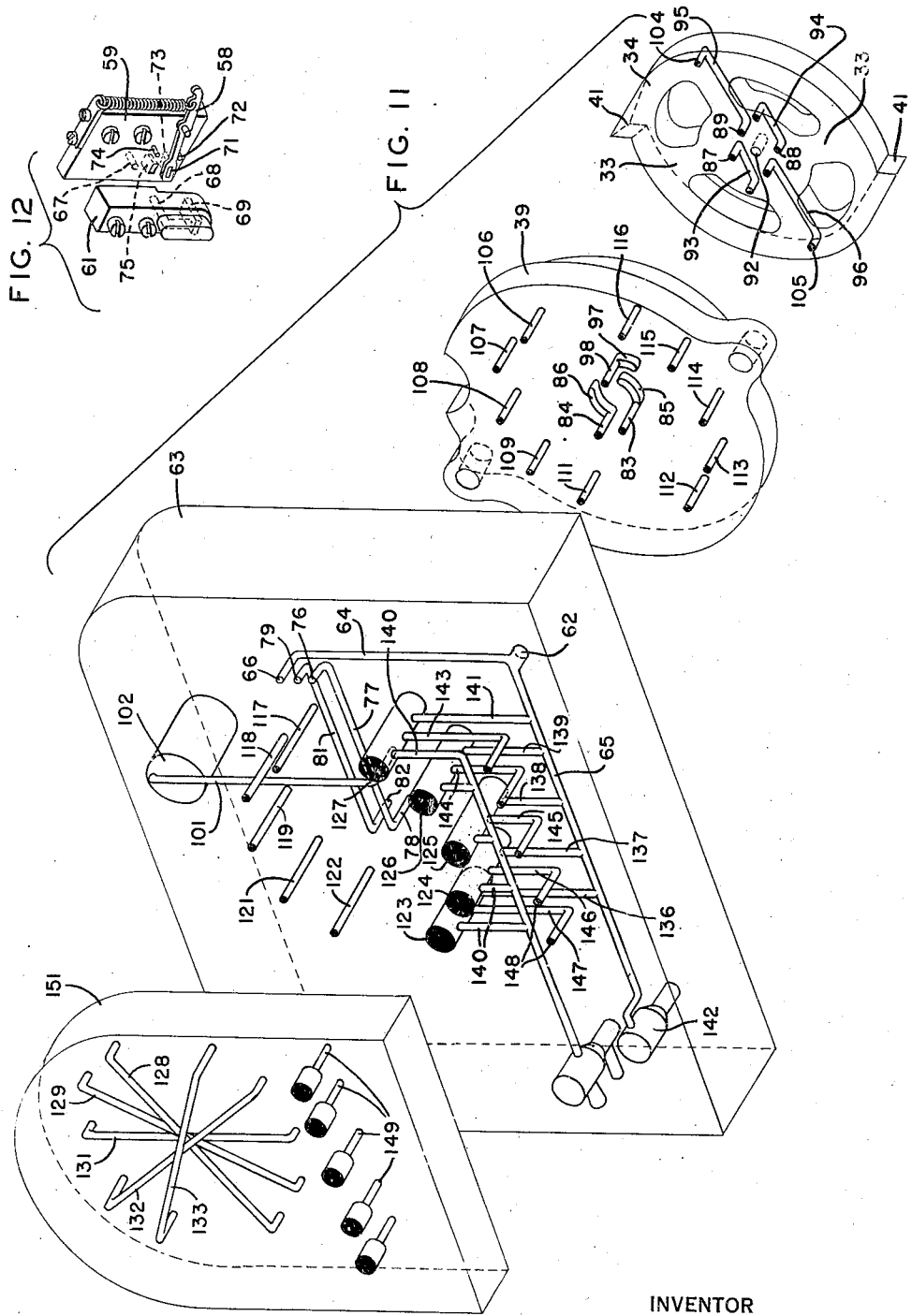
INVENTOR
EDWARD E. KLEINSCHMIDT
BY
ATTORNEY

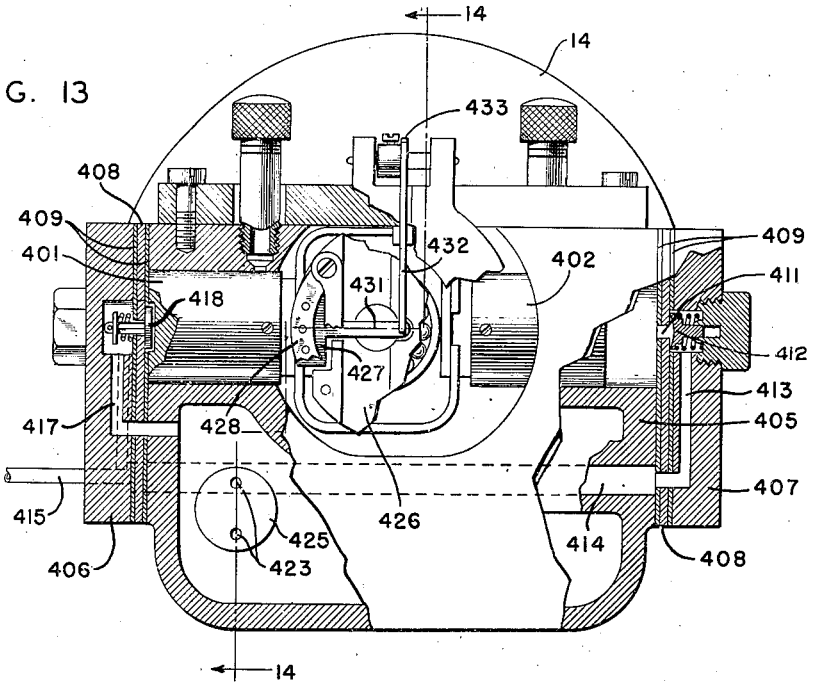
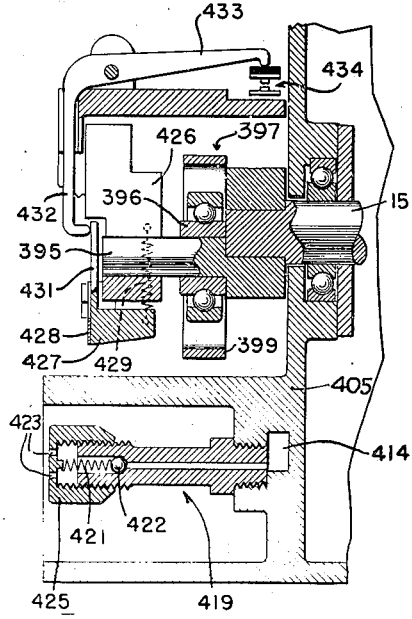
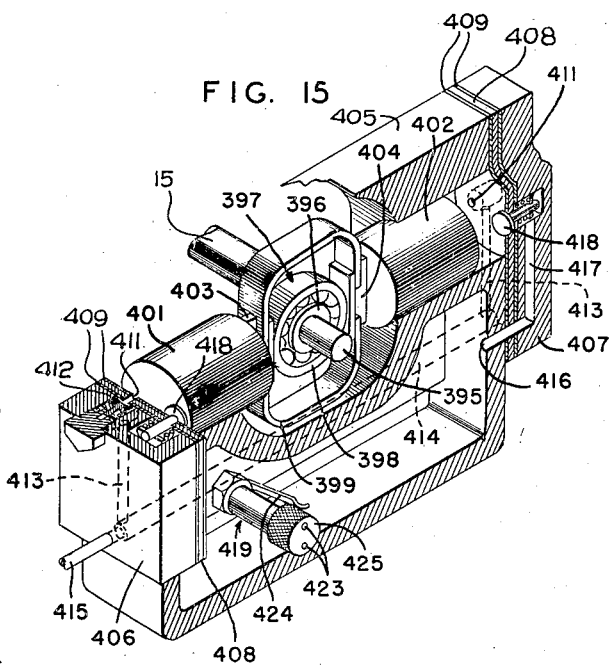

Oct. 15, 1940.   E. E. KLEINSCHMIDT   2,218,113
PNEUMATIC PRINTER
Filed June 18, 1937   10 Sheets-Sheet 10

INVENTOR.
EDWARD E. KLEINSCHMIDT
BY
ATTORNEY.

Patented Oct. 15, 1940

2,218,113

UNITED STATES PATENT OFFICE 2,218,113

PNEUMATIC PRINTER

Edward E. Kleinschmidt, Highland Park, Ill., assignor to Teletype Corporation, Chicago, Ill., a corporation of Delaware Application June 18, 1937, Serial No. 148,944

19 Claims. (Cl. 178—29)

The present invention relates to printing telegraph apparatus, and particularly to printing telegraph machines actuated pneumatically in accordance with electrical impulses for recording the message in printed characters in page form.

An object of the present invention is the provision of aggregate motion setting mechanism which is positionable instantaneously that the electrical signals pertaining to the components thereof are effective.

Another object of this invention is to provide a pneumatically operated printing telegraph machine which is simple, reliable, and inexpensive to manufacture and which has its operations performed efficiently under the supervision of start-stop telegraph control signals.

Another object of the present invention is to provide a pneumatic printing apparatus in which electrical permutation code signals are converted into fluid operations which directly and instantly position typing mechanism into type selecting condition.

In fulfilling the above and other objects, the present invention contemplates several mechanical features having particular reference to a pneumatically actuated selector mechanism and control means therefor which govern the rotation and shifting of a selecting piston and a cylindrical type wheel. The apparatus responds instantaneously through utilizing certain principles and embodiments whereby, under the stimulus of a selectively controlled fluid, complete performance on the part of the selecting and printing apparatus is obtained during the same signal interval in which the selecting impulses of a five-unit code are received. That is to say, the complete selection and performance is initiated and substantially fully executed within the same cycle during which its selection signals are received, or without having to avail of the purposes afforded by overlap devices and mechanisms.

Line signals are impressed upon a receiving relay which constitutes the sole electrically responsive device employed in the receiving printer. An armature of this relay, which operates in response to the electrical signals, directs the channeling of a fluid from a central supply source to a set of selector operating pistons, five in number (in an embodiment which utilizes a five-unit code). Two of said operating pistons, acting through the medium of an aggregate motion linkage, determine the vertical movement of a type carrying spindle, while the remaining three operating pistons, acting through another aggregate motion linkage, control the axial rotation of said spindle through 180°, thus affording selective accessibility to one-half the cylindrical surface of the type wheel. A case shift operating apparatus responsive to a special code combination signal is adapted to rotate the type wheel spindle through a complete 180° revolution after which the five pistons aforementioned are effective to position selectively the other half of the type wheel cylinder. Thus, there is obtained through case shift supervision and under pneumatic control and operation a total of sixty-four selective possibilities available for character, stunt, and case shift operation.

For a better understanding of the present invention, reference may be had to the detailed specification following hereinafter and to the accompanying drawings in which;

Fig. 2 is a side elevation of the printing machine having portions of the electric motor, distributor, and line relay broken away;

Fig. 3 is a detailed perspective view of the selector mechanism and fluid distributing devices having certain portions broken away and other portions partially dismantled;

Fig. 4 is a plan view of a portion of the printing machine having fragments of the platen and carriage broken away to reveal the posterior mechanism for controlling the line feed and carriage return functions;

Fig. 5 is a sectional view taken transversely of the type wheel spindle as indicated by the line 5—5 on Fig. 4;

Fig. 6 is a fragmentary detailed view of the shiftable carriage mechanism in which the principal supporting plate is broken away so as to reveal the manner and means of operating the carriage return and line feed;

Fig. 7 is a detail front elevation of the fluid distributor block, line relay, and mountings therefor;

Fig. 8 is a rear elevation of a distributor block such as the one illustrated in Fig. 7;

Fig. 9 is a transverse sectional detail view taken approximately on line 9—9 of Fig. 8;

Fig. 10 is a detailed sectional view taken approximately on line 10—10 of Fig. 8;

Fig. 11 is an exploded perspective view, bracketed, of the principal members which constitute the fluid distributing block of Figs. 7 and 8 drawn in phantom to reveal the more intricate channeling which extends into and through these several members;

Fig. 12 is an exploded perspective view of the fluid shuttle lever and its associated conduit blocks;

Fig. 13 is a side elevation of a fluid pressure generating pump or compressor such as may be employed for the purpose of supplying operating fluid to a printing apparatus such as herein disclosed;

Fig. 14 is a transverse sectional view through the compressor mechanism and is taken on line 14—14 of Fig. 13;

Fig. 15 is a perspective sketch illustrating the arrangement of the compressor pistons and their fluid connections;

Fig. 17 is a transverse sectional view through the valve unit associated with the case shift mechanism;

Fig. 17a is a longitudinal sectional view through the selector piston illustrating its manner of assembly and the arrangement of its probing ducts and supply channel; and Fig. 18 is a bracketed illustration of the comparative relationship of the type wheel and selector jacket as portrayed by equal sized developments of each.

Figure 1:
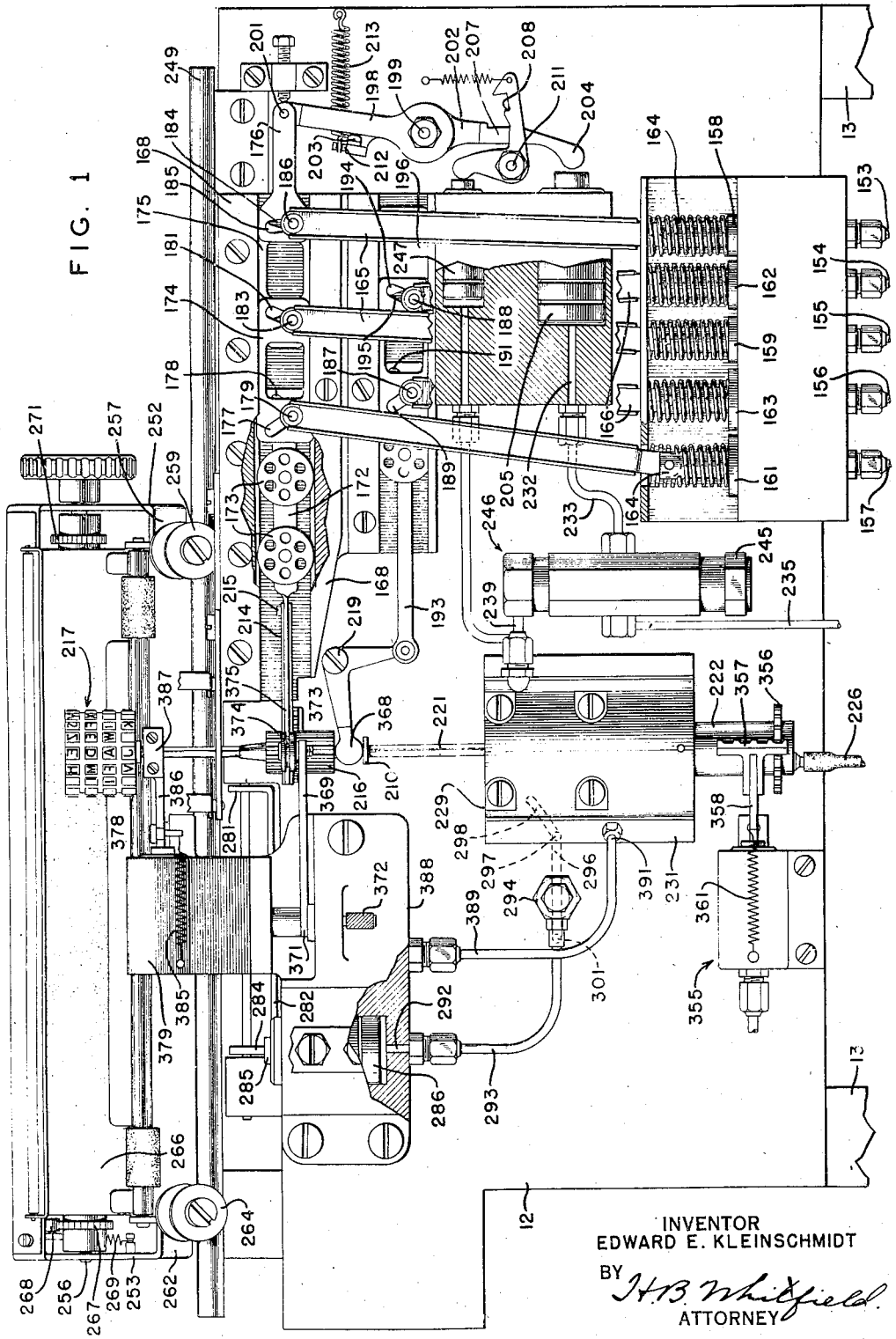
Fig. 1 is a front elevation of the principal portion of the printing unit viewed in a direction perpendicular to the main supporting plate.

Referring now particularly to the disclosure of the accompanying drawings, the reference character 11 will be observed to designate a base plate upon which, in the present embodiment, are supported all of the elements which constitute the present unit. Another plate indicated 12 is secured to said base plate 11 through the intermediate support of a pair of end pillars 13. Figs. 2 and 5 indicate clearly the angle at which base plate 12 is disposed, and for consistency throughout the present description, the side of the plate revealed in Figs. 1 and 3 will be referred to as the front, both of the plate as well as of the unit, while the opposite side will be referred to as the rear.

An electric motor 14 is mounted at the rear of the unit upon a supporting block, and on its shaft 15 it carries a driving worm 16 which meshes with a worm wheel 17 imparting clockwise rotation thereby to the driven shaft 18, see also Figs. 8 and 9, through the medium of a friction clutch generally indicated 19. The manner in which this power is communicated may be observed in Fig. 9 where it will be noted that worm wheel 17 is secured upon a sleeve 21 integrally formed with the driving disc 23 of clutch 19 and surrounding the enlarged portion 22 of shaft 18. A spring tensioning washer 24 presses against a slidable disc 25 while between said disc 25 and the driving disc 23 there will be observed the driving plate 26 and the intervening slip washers 27. The positive rotation of driving disc 23 is thereby yieldably communicated to driving plate 26, and the latter, in turn, imparts this movement through a connecting arm 28 to the shaft 18 upon which it is secured.

Another driving arm 29 is formed with an enlarged collar 31 secured to shaft 18 which, as indicated in Fig. 8, has integrally formed therewith the cam projections 32 at 180° from each other. The principal portion of arm 29 proper extends parallelly to shaft 18 and is forked at its extremity whereat it straddles one of the spokes 33 of the distributor plate 34, Fig. 11.

Shaft 18 with its enlargement 22 is journaled in the standards 35 and 36, and at its end carries a longitudinally adjustable end thrust collar 37 for abutting the tensioning spring 38, which urges against distributor plate 34, maintaining the latter constantly in wiping engagement with a channel distributing block 39, see also Fig. 11.

Distributor plate 34 is of identical construction with a similar distributor plate indicated 26 and illustrated in copending application Serial No. 121,520, filed January 21, 1937. It consists essentially of an integral member having a pair of oppositely presented stop shoulders 41 and sets of bridging arteries which will be described later. The cam projections 32 of collar 31 act upon a reciprocable follower lever 42, Fig. 8, pivoted upon a stud 43 which is anchored in the standard 35 and urged by the torsion spring 44 in a counterclockwise direction so that its follower nose 45 tends to pursue the periphery of collar 31 and its projections 32. The working end of lever 42 comprises a tongue 46 which is received within a slot 47 of a controlling T-lever 48 pivoted at 49, Fig. 17, intermediate its disc nodes 51 and 52. The tendencies of cam projections 32 are, therefore, to rock lever 42 clockwise, Fig. 8, and to cause the latter to, in turn, rock control T-lever 48 clockwise about its pivot 49, Fig. 17, pressing inwardly the valve stem 53 and permitting to emerge slightly the valve stem 54. Each of the valve stems 53 and 54, being urged outwardly by their respective retractile springs 55, produce thereby a cyclic control for a purpose which will be understood later with the explanation of the fluid operating circuit.

*The pneumatic circuit*

Figure 16:
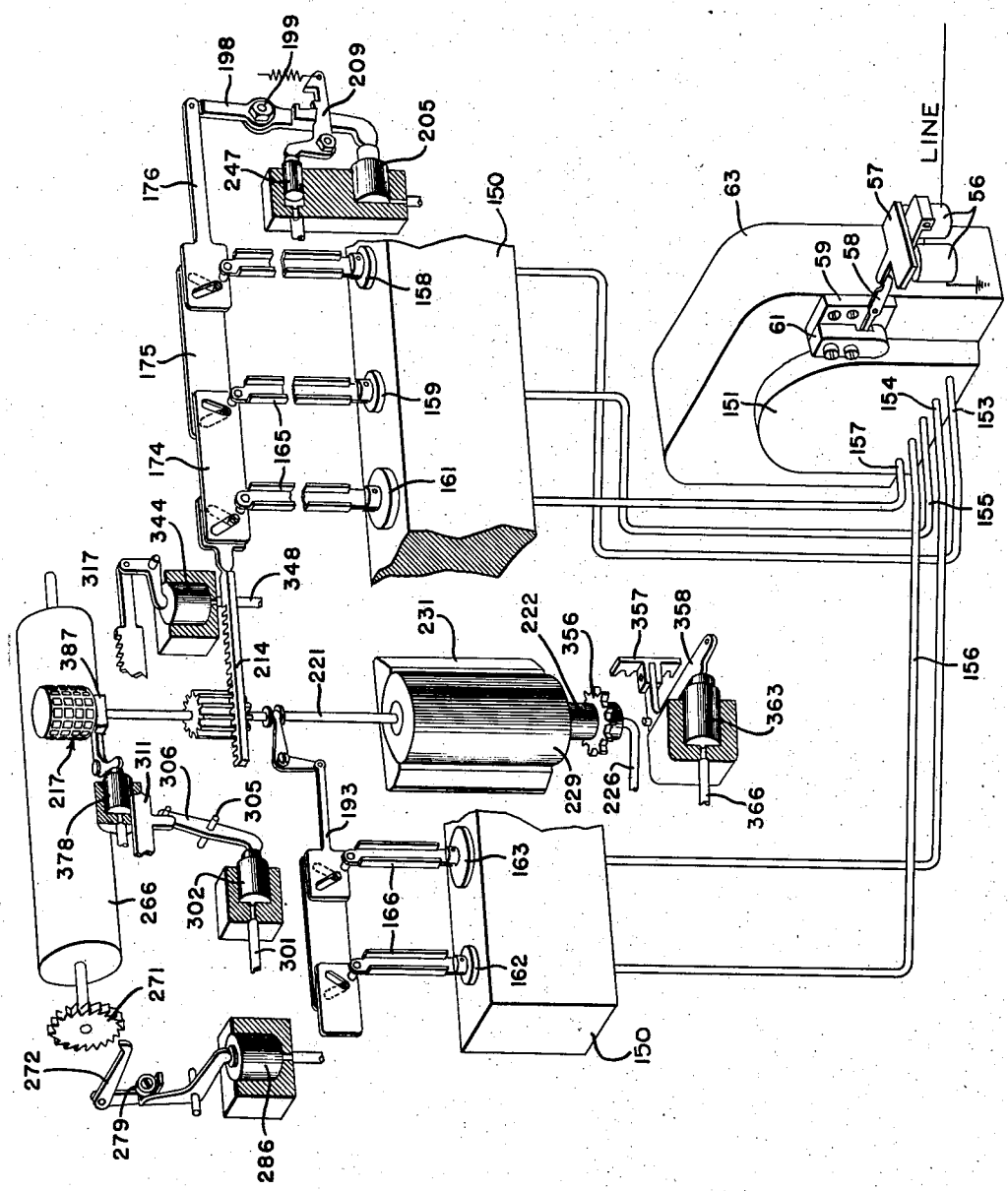
Fig. 16 is a diagrammatic chart of a fluid operating circuit in accordance with the present system in which the principal elements have been indicated conventionally in a manner to relate them with their corresponding elements, which are more accurately portrayed in the foregoing referred to illustrations.

In Fig. 16 there is conventionally portrayed a circuit such as may be employed in conjunction with the hereinafter described embodiment. Conventional permutation code start-stop signals are transmitted over a line and the current variations are impressed upon the electromagnet 56, see also Figs. 7 and 11, causing its armature 57 to fluctuate and, in turn, to reciprocate the shuttle valve 58. The construction and operation of magnet 56 and its shuttle valve 58 is the same as that of magnet 55 and shuttle valve 56 illustrated in the copending application referred to above.

Fig. 12 illustrates a shuttle valve main block 59 and its adjunct block 61. Fluid pressure supplied from any convenient source, such as the compressor illustrated in Figs. 13 to 15, is introduced into the inlet 62, Figs. 7 and 11, of the distributor block 63 whence it is directed over two courses, the vertical canal 64 and the horizontal distributing canal 65.

The vertical canal 64 leads to a laterally emergent duct 66 which communicates with the connecting way 67 of shuttle valve main block 59 and continues on through the redoubled course 68 until it attains the shuttle orifice 69. At this point, its course is alternative depending upon the position of the shuttle lever 58. When the lever opening 71 is in its down position, viz., with the lever 58 abutting the stop pin 72, then communication is established between shuttle orifice 69 and the lowermost slot 73; but when shuttle valve 58 is in its clockwise extreme position, abutting stop pin 74, then communication is established between shuttle orifice 69 and the upper slot 75. Since lever 58 is reciprocated in rhythm with the incoming line signals, marking and spacing line conditions are accordingly interpreted as fluid surges over the two courses, to be subsequently described, headed by the slots 73 and 75.

Slot 73 communicates with the inlet 76, Fig. 11, in distributor block 63 and continues over the channel 77 to the exit opening 78, while the alternative course from slot 75 continues through inlet 79, over channel 81, to the exit opening 82. Exit openings 78 and 82 communicate respectively with the continuation channels 83 and 84, which terminate at the rearmost surface, Fig. 11, of channel distributing block 39 with the arcuate moats 85 and 86. The curvature of the two moats 85 and 86 is identical and each is in registration radially with a circular path described by the openings 87, 88, 89, and 91 in distributor plate 34, all of which are equidistant from the pivotal hole 92.

Openings 87 and 88 form part of the re-emergent arteries 93 and 94 respectively, while openings 89 and 91 are part of the re-emergent arteries 95 and 96 respectively. Since, under conventional telegraph practices, idle line condition is marking, then it follows that the selective fluid channel including slot 73, continuation channel 82, and arcuate moat 85 will, in response to an opposite or spacing signal, convey a start surge over either of the arteries 93 or 94 when the emergent openings thereof are in communication with a short arcuate moat 97. This start pulsation, taking the form of a pneumatic surge, is then communicated over channel 98 of channel distributing block 39, its aligned channel 99 of distributor block 63, and vertical channel 101 to the piston chamber 102 of a start piston 103, see also Fig. 9. The start piston acts upon a spring loaded stop pawl 100 in a manner which is fully explained in the copending application referred to above. The bridging between arcuate moats 85 and 97 may be effected by either of the arteries 93 or 94 since the system is designed to afford two cycles of operation for each revolution, and since all of its parts are designed with similar parts in symmetrical opposition; for example, the bridging arteries 93 and 94, 95 and 96, and stop shoulders 41.

As another advantage resulting from this symmetry of design, there is afforded here too, as in the copending application Serial No. 121,520, an arrangement for shifting positively, under the impetus of a fluid surge, each fluid routing piston of the selector as will now be described. The bridging arteries 95 and 96 terminate at their remote extremities with the openings 104 and 105, each of which wipes across a circular course in which lie corresponding openings of selector channels 106, 107, 108, 109, and 111 and their opposite selector channels 112 to 116. Each set of channels 106 to 111 and 112 to 116 lies in an arcuate section of said circular course which will be referred to as the selecting arc, while between the initial channels of each set 106 and 112 and the final channels thereof 116 and 111 is an angular distance of separation considerably greater than the distance between any two channels of a set which will be referred to hereinafter as the operating arc, because during the transition of this portion of each cycle, a selected condition, established by the preceding set of channels, is consummated into an operation, printing or otherwise.

Selector channels 106 to 111 connect with associated connector ducts 117, 118, 119, 121, and 122, while selector channels 112 to 116 connect with the valve chambers 123 to 127, see also Fig. 9. Connector ducts 117 to 122 communicate with the inlet openings of the bridging arteries 128, 129, 131, 132, and 133 in auxiliary block 151, the outlet openings of which arteries are disposed to align with the aforedescribed chambers 123 to 127, but at the opposite ends with respect to the selector channels 112 to 116.

Within each one of the valve chambers 123 to 127 is a cylindrical slide valve 134 having a reduced intermediate portion 135 of sufficient width to connect by spanning either of the extreme vertical ducts 136 to 141 or 140 with the central ones. Thus, as illustrated in Fig. 9, with a valve 134 in its left-hand position, communication is established between a central duct and a left side duct. The movement and consequent presentation of each valve 134 is supervised by a fluid surge and depends upon whether it is routed over one or the other of the aforedescribed alternative routes during its particular signal interval. For example, a supervisory surge may be routed through selector channel 114 to the right end of piston 134, Fig. 9, or it may be routed over channels 108 and 119, bridging artery 131, to the left end of piston 134.

Viewing now Figs. 9 and 11, it will be noted that the right-hand vertical ducts 136, 137, 138, 139, and 141 connect parallelly at their lower ends with the horizontal distributing canal 65 the distant terminus of which extends into the large chamber 142 of valve 53, see also Fig. 10. The intermediate or central vertical ducts 143, 144, 145, 146, and 147 connect with a horizontal row of emergent openings 148, and these, in turn, communicate through continuation ducts 149 in the auxiliary block 151 with the terminal nipples 152 to which, as best indicated in Figs. 2, 7, 9, and 16 are connected the flue pipes 153, 154, 155, 156, and 157.

Pipe 153, entering through a connector nipple in a piston block 150 communicates with the piston chamber of a piston 158, Figs. 1 and 3, of the rotary selection set of pistons as do pipes 155 and 157 with the piston chambers of pistons 159 and 161, while pipes 154 and 156 connect with the piston chambers of the vertically shifting selection pistons 162 and 163. Each piston has an upright stud shaft 164 which is pivotally articulated to a pitman 165 or 166, the former being associated with the rotary movement selection and the latter with the vertical movement selection to be described later.

On a face block 167, which is mounted on base plate 12, are a pair of supporting rails 168 and another such pair 169. Each pair of rails is grooved as at 171 and within the grooves of rail pair 168 there is received a train of elements comprising the end bar 172 and its pivoted roller wheels 173, a double-plate connecting bar 174, another connecting bar indicated 175, and a pair of plates constituting an end bar 176. At the left end of connecting bar 174 is an inclined slot 177 while in end bar 172 is a similar slot 178 having a corresponding inclination but in an opposite direction to said slot 177. A cam pin 179, which is secured to the end of the pitman of piston 161, extends through slots 177 and 178 so that upon the vertical movement of cam pin 179, in response to the operation of piston 161, end bar 172 is forced in a direction away from connecting bar 174 and is made thereby to travel a predetermined distance for a purpose to be described hereinafter.

The right end of connecting bar 174 is provided with a slot 181 having an inclination whose horizontal component is half as great as that of slot 177, while a symmetrical and opposite slot 182 is provided in the corresponding end of connecting bar 175 so that upon the operation of piston 159, a cam pin 183 carried in the end of its pitman 165 cams connecting bar 174 away from connecting bar 175 a distance equal to one-half the distance moved by the aforedescribed cam pin 179.

In a similar manner, the right end of connecting bar 175 is provided with an inclined slot 184, and bar 176 with an oppositely inclined slot 185. The movement of cam pin 186, associated with piston 158 in a vertical direction, cams connecting bar 175 a distance one-half of that effected by cam pin 183, away from end bar 176. As a result of this arrangement, there is afforded through the permuted action of pistons 158, 159, and 161, a manner of obtaining linear movement on the part of end bar 172 in accordance with the permutation possibilities of the base number 3 or a total of eight variant distances of movement.

Pistons 162 and 163 have at the ends of their pitmans 166 a similar pair of cam pins 187 and 188, the former extending through the inclined slots 189 and 191 of the connecting bar 192 and end bar 193, while the latter cam pin 188 extends through the inclined slots 194 and 195 of connecting bar 192 and end bar 196 respectively. End bar 196 is anchored at 197 to a stationary part of the unit, but end bar 176 is pivotally connected to an arm 198 at 201, which arm 198 is pivotally carried upon a stud shaft 199. Also carried on said stud shaft 199 is a latchable lever 202 having a sidewardly extending lug 203, which is adapted to abut one side of arm 198, and a lobe extremity 204, which is extended into the path of a piston 205. A torsion spring 206, Fig. 3, wound about the shaft 199 is hooked over one arm of said lever 202 at one of its ends and arm 198 at the other of its ends, causing to be imparted relative rotation between said lever 202 and arm 198 until said lug 203 encounters the side of arm 198. Thus, lever 202 and arm 198 are made to move as a unit except when sufficient counterclockwise rotation is imparted to lever 202 or clockwise rotation to arm 198 in order to overcome the tension of spring 206.

The lower arm of lever 202 has intermediate its length a shouldered boss 207 which lies in the path to be engaged by a shoulder 208 of a bell crank latch 209 pivoted at 211. At the upper end of lever 202 is an anchor pin 212 to which is connected one end of a coiled return spring 213 the other end of which is anchored to the plate 12. The coiled spring acting through lever 202 tends to maintain the assembly in its clockwise position, as indicated in Fig. 1, but upon the energization of piston 205, lever 202 is rotated counterclockwise in opposition to the tendency of spring 213, and through spring 206, arm 198 is also rotated counterclockwise.

The distance of linear movement of the pivotal point 201 in response to the energization of piston 205 is equivalent to the sum of the distances of linear movement caused by the cam pins 179, 183, and 186 and is sufficient to enable a rack bar 214, which is connected at 215 to end bar 172, to impart to the rack gear 216 180° of rotation. Accordingly, cam pin 179 serves to generate 90° of movement on the part of gear 216, cam pin 183 45° of movement, and cam pin 186 22½° of movement. It will be noted from the foregoing that by the use of piston 205 and cam pins 179, 183, and 186 permutably, there may be effected 360° of rotation of rack gear 216 in equal angular distances of 22½° difference from each other or a total of sixteen angular permutations. For this reason, the type wheel 217 may be noted as having throughout its periphery sixteen character bosses indicated in the development on the upper portion of Fig. 18.

Cam pins 187 and 188 being only two in number attain a total permutation possibility of four, and accordingly they impart a corresponding number of positions to end bar 193, which is articulated with the type wheel shaft 221 through a bell crank 218 pivoted at 219 and having the clevis 368 presented between its pinion 216 and the cooperating disc 210, see also Figs. 3, 5, and 16. The four vertical positions of shaft 221 permit the use of four horizontal rows of type characters as indicated in the development of Fig. 18. Lever 202, piston 205, and bell crank latch 209 constitute a case shift operating medium as will be more particularly disclosed, and for the initiation of said case shift, two permutation signals are employed.

The type wheel development shown in Fig. 18 illustrates the character allotment of each permutative position, but it will be noted that certain positions indicated by the shaded squares are not employed for character printing selection. These have been utilized for the purpose of effecting miscellaneous collateral function or "stunt" controls.

*Special functions*

Integrally associated with the type wheel shaft 221 is a stunt selecting piston 222, Figs. 1, 3, 5, and 17a. Extending upwardly within this piston 222 is a channel 223 which, in the instant embodiment, terminates with two ducts 224 and 225. Air pressure from a convenient supply source, such as the compressor herein described, is introduced into the channel 223 through the flexible conduit 226 and nipple 227. As shaft 221 is moved upwardly into any of its four positions under the control of pistons 162 and 163 and rotated under the control of pistons 158, 159, 161, and 205, probing ducts 224 and 225 are variously presented within the inner cylinder wall 228 of a jacket 229. In certain locations of the inner cylinder wall 228, which correspond to certain of the type wheel squares which have not been assigned to character selection, there may be noted small openings 248 which lead respectively to the operating pistons of special functions. In the developed surface 228 of Fig. 18, there is indicated an arrangement whereby several special functions may be controlled in this manner. Since, however, all of this available number of selections is not necessary for the purpose of controlling the collateral functions of the present printing apparatus, it is deemed obvious that unused permutation selections may be permitted to remain unassigned merely by the omission of said openings from the cylindrical surface 228.

In the present embodiment, jacket 229 is fitted upon a mounting plate 231 which serves additionally to support the jacket 229 as a means for routing the selective channels for miscellaneous ones of the special functions as will be particularly indicated. There has already been mentioned the case shift piston 205, see especially Fig. 1. The chamber of this piston is filled by the operating fluid obtained through a supply duct 232, conduit 233, see also Fig. 17, valve duct 234 from a fluid supply source 235, when the valve 236 is depressed against the tendency of its return spring 237, by the introduction of a selective fluid through the passageway 238, which leads over a conduit 239 and channel 241 from the selectable orifice 242.

After the "case shift" selection has been established and the selecting fluid coming in through passageway 238 is cut off, valve 236 is restored to its normal condition, as indicated in Fig. 17. The chamber of piston 205, Fig. 1, is connected over conduit 233 with the bleeder opening 243 in valves 236 and 244 of the sealing cap 245. The purpose of providing the valve unit 246 instead of operating piston 205 directly from conduit 239 is to afford a direct pressure supply thereto. The amount of fluid admissible through the selecting unit (which comprises jacket 229 and selecting piston 222) is necessarily limited, and although it might be adequate for the operation of certain of the function performing pistons; for example, the case unshift piston 247, it has been found preferable in the case of certain other functions to execute them under direct pressure supply by the use of a device serving in the manner of valve unit 246.

Stunt selecting piston 222, although disposed at some distance below it, may be considered as being a cylindrical continuation which rotates with and which is shifted vertically in unison with type wheel 217. When any type character is brought into printing position, probing ducts 224 and 225 are brought into a corresponding position. If the particular placement relates to the selection of a printing character, then in accordance with the present arrangement the particular character will be brought into printing alignment on the type wheel, probing duct 224 will be placed so as not to align with one of the openings 248 of the inner cylinder wall 228, and probing duct 225 will be placed so as not to be obstructed by one of the protuberances 354 of the cylindrical zone 353. On the other hand, if the particular position relates to the selection of a special function or "stunt" then one of the shaded areas of the type wheel 217 will be brought into alignment with the printing position, the probing duct 224 will be brought into alignment with a particular one of the selectable orifices 248 depending, of course, upon the particular function which is being thus selected, and probing duct 225 will be brought into alignment with one of the protuberances 354 of the cylindrical space 353. As will be explained later, the registration of the probing duct 225 with one of the protuberances 354 causes to be effected a blocking off of the print hammer operation (piston 378) and/or the character feed or spacing operation (piston 344). Since in the case of a stunt selection the print bell crank is not to be actuated, one of the protuberances 354, by blocking the entrance of fluid out of duct 225, thereby bars its introduction into the cylindrical space 353 and accordingly also to the print bell crank actuating piston 378.

Each of the selectable orifices, generically indicated 248, Fig. 18, represents a stunt selecting channel. It may not be found necessary to utilize all of the available possibilities as indicated by the shaded areas in development of type wheel 217. Surplus selective possibilities may be omitted from the system merely by omitting to provide an orifice 248 in those positions corresponding relatively to the shaded sections of the type wheel 217. During the course of the following description, certain ones only of the selectable orifices 248 will be described in connection with the special functions to which they have been allocated.

Shiftable carriage

Figs. 1, 2, 4, 5, and 6 illustrate the shiftable carriage mechanism which is supported upon a pair of parallel rods 249 and 251. The principal carriage frame comprises a pair of sheet metal side members 252 and 253 transversely supported by a longitudinal truss 254, a paper guide plate 255, and to some extent by the platen spindle 256. Side member 252 is provided with the lugs 257 and 258 bent at right angles and to which are anchored shouldered pivot screws of the rollers 259 and 261. Upon the opposite side frame 253 on symmetrically opposite lugs 262 and 263 there are supported a similar pair of rollers 264 and 265, Fig. 6. The four rollers 259, 261, 264, and 265 ride upon the parallel rods 249 and 251 and enable the carriage as a unit to ride parallelly to and fro during letter space and carriage return operations.

A cylindrical printing platen 266 surfaced with elastic material is carried upon the platen spindle 256 which is pivoted in the side frames 252 and 253. Near one of its ends there may be noted a star wheel 267 integrally associated with the platen 266 and shaft 256 and against the periphery of said star wheel there is in constant engagement a detent jockey 268 whose tensioning spring is indicated 269, Figs. 1 and 6.

At the opposite end of the platen 266 there is provided a feed sprocket 271, Fig. 5, also integrally associated with the platen assembly and adapted to be engaged by the feed pawl 272 which is pivoted at 273 upon an arm 274, and which is urged in a clockwise direction about its pivot under the influence of a torsion leaf spring 275. Arm 274 constitutes a perpendicular extension of a cradle 276 pivoted upon a transverse rod 277 formed with an upwardly and leftwardly extending lip or bail 278, Figs. 2 and 5.

The roller 279, seen in Fig. 5 as resting upon the bail 278, is pivotally carried by an arm 281 of another cradle 282 pivotally supported by the shaft 283 within a recess of base plate 12, Fig. 1. On the end of cradle 282 opposite arm 281 is another arm indicated 284 which terminates with a follower lobe that rests against a button 285 at the upper end of the line feed operating piston 286. In the present embodiment, the line feed operating piston 286 is illustrated as being housed in a piston chamber of a bracket 287 carried by the supporting plate 12. To limit the extent of travel of the pneumatic piston 286, a stop screw 288 is provided which, by means of the check nut 289, may be adjustably secured in the holder 291.

In response to a line feed signal, a fluid surge is introduced into the chamber beneath the piston 286 over a course including channel 292, Fig. 1, conduit 293, an elbow fitting 294, thence a passageway afforded by a groove 296 on the rear surface of plate 12 covered by the piston block 295, Fig. 6. From groove 296 the course extends through an opening 297 transversely of the plate 12 and thereafter along a passageway afforded by a groove 298 on the front surface of plate 12 following which it continues through an opening 299 in mounting plate 231, Fig. 3, communicating thereat with one of the selectable stunt selecting orifices 248 of inner cylinder wall 228.

Returning for the moment to groove 296, it is called to attention that from this point a branch passageway is afforded through an opening 301, Figs. 1 and 6, which leads away from the observer thence rightwardly and into the piston chamber of a carriage return operating piston 302 in piston block 295. From this it will be evident that both the carriage return function and the line feed function respond to a single initiating signal. The combining of these two functions is deemed a constructional convenience, and it is considered to be an advantageous arrangement over providing separate selecting passageways from each of said operating pistons to an individually selectable orifice 248 in which case the two functions would be executed individually and in response to separate initiating signals.

The line feed operating piston 286 rocks its cradle 282 in a clockwise direction, Fig. 5, causing, through roller 279, the rocking of cradle 276 in a counterclockwise direction and moving line feed pawl 272 leftwardly during which movement its tooth engages one of the teeth of sprocket 271 rotating the printing platen 266 through one or more angles corresponding to each of the teeth of feed sprocket 271. Well-known expedients may be employed for regulating the poised position of feed pawl 272 so that more than one tooth at a time of sprocket 271 may be engaged so that a greater movement be permitted on the part of pawl 272 toward the end of obtaining multiple line spacing. The centering and radial alignment of the platen assembly is assured by the operation of detent jockey 268 and star wheel 267.

Carriage return piston 302, responding to the same impulse that operated line feed piston 286, engages with its button 303 one arm 304 of a release lever pivoted at 305 the other arm 306 of which terminates with a sidewardly extending pin 307, and at its mid-portion carries the square latching peg 308. Pin 307 juts into the path of a depending lug 308 integrally formed with a stripper blade 311. At its opposite ends, blade 311 is provided with inclined slots 312 through which there pass the two anchored pins 313. The action of carriage return piston 302, when transmitted through lever 304—306 to the stripper blade 311, causes the latter to be cammed upwardly by reason of the engagement between the pins 313 and the inclined slots 312. This raises the upper edge of blade 311 until it projects slightly beyond the teeth 314 of stationary bar 315 as well as the teeth 316 of the longitudinally shiftable bar 317.

Bars 315 and 317 are similar members generally, the former being rigidly secured upon the anchored pins 313 and the latter having the longitudinal slots 318, which permit of its being moved in a horizontal direction throughout a distance coincident with the length of one of its teeth 316. It is to be noted that preferably, though not necessarily, teeth 314 and 316 coincide, as viewed transversely in accordance with the illustration in Fig. 6. A spring tensioned latch pawl 319, pivoted at 321, engages the teeth 314 of the rigid bar 315, while a sidewardly extending portion of its toothed extremity 322, Fig. 4, overlies stripper blade 311. In a similar manner, another pawl 323 also pivoted at 321 and similarly spring tensioned, engages the teeth 316 of longitudinally shiftable bar 317, while a sidewardly extending portion 324 of its toothed extremity overlies the intermediate space above stripper blade 311.

When, as previously described, the stripper blade is raised until it attains a level higher than the teeth 314 and 316, then both pawls 319 and 323 are freed from engagement with their respective bar teeth 314 and 316 permitting the carriage assembly to be moved rightwardly, Fig. 6, in which direction it is constantly urged by a tension spring 325, Figs. 5 and 6. This spring, one end of which is suitably anchored to a stationary portion of the unit, is connected at its other end to an arm 326 pivoted on a mounting block 327 by means of the shouldered pivot screw 328. The free end of arm 326 carries, pivotally articulated at 329, a connecting link 331, Fig. 4, an opposite end of which is pivotally secured to the truss 254 at 322. When the energy of spring 325 is being spent in returning the carriage and as the carriage approaches its starting position with respect to the printing of a line, its movement is snubbed when a lug 333, Fig. 4, which is secured to truss 254, encounters the extremity of spring loaded plunger 334, which is integrally associated with a check piston contained within the housing 335.

Shortly before the arrival of the carriage at its starting position, a trip pin 336, Fig. 5, integrally associated with it encounters the extremity 337 of a latching bell crank pivoted at 338. The latch arm 339 of this bell crank is adapted, following the operation of piston 302, to present its toothed extremity behind square latching peg 308, maintaining the lever 304—306 in its counterclockwise extremity and stripper blade 311 in its effective position until, as has just been described, the ultimate arrival of the carriage at its destination, at which time the several elements are restored to their normal position. The return of stripper blade 311 is urged by the continuous influence of a spring 341, Fig. 6.

With the printing of each character, the platen is advanced in a horizontal direction by a letter spacing mechanism which includes the longitudinal shiftable bar 317, just described, a power spring 342, which engages the depending extension 343 thereof urging it leftwardly, Fig. 6, and an operating piston 344 for moving it in an opposite direction. Through the efforts of spring 342, longitudinally shiftable bar 317 is moved leftwardly causing, through pawl 323, the letter feed or spacing operation, but not until said bar 317 has first been moved rightwardly by the piston 344. This piston, acting through a bell crank 345 pivoted at 346, receives its operating surge of fluid through a passageway which includes the canal 347, Figs. 5 and 6, opening 348, the surface ridge 349 in base plate 12, and the transverse ducts 351 and 352 in mounting plate 231 and jacket 229. Thereafter the passageway communicates with the cylindrical space 353, Figs. 3 and 5, which surrounds stunt selecting piston 222 in the sphere traversed by its opening 225.

Since the opening 225 is directly in communication with the air supplied through conduit 226, it will be understood that an ample fluid surge may in this manner be made available for the purpose of actuating the character space piston 344. There may be noted that at certain locations within the cylindrical space 353 there are found protuberances 354 integrally formed in the jacket 229. When stunt selecting piston 222 is so disposed that its probing duct 225 is presented opposite one of the protuberances 354, fluid is thereby cut off from the cylindrical space 353 and prevented from entering the piston chamber of character space piston 344, and accordingly, in the case of these certain selections, character spacing as well as print bell crank operations (described above) are prevented.

The construction of jacket 229 lends itself to accommodate an auxiliary fluid supply which is employed for the purpose of actuating an accompanying or a frequently initiated function, but upon certain occasions these functions are to be suspended from their performance. In other words, the construction of the protuberances 354 within the cylindrical air column 353 teaches a method of disabling or suspending the performance of auxiliary or collateral function apparatus during the control of certain selector mechanism which selects a primary function.

Not all examples of auxiliary or collaterally operating pneumatic apparatus are to be subjected to the aforedescribed disabling apparatus, however, since in some instances it may be desired that the auxiliary response should prevail uninterruptedly and continue in accompaniment with each selection. An example of one such auxiliary device is the selector locating and centering unit generally indicated 355, Figs. 1, 3, and 4. The lowermost portion of the stunt selecting piston 222 is fringed with a plurality of sprocket teeth integrally formed in a sprocket disc 356. The number of teeth correspond to the number of peripheral divisions in the type wheel 217, which essentially is also the peripheral divisioning of the inner cylinder wall 228 as well as the nether cylindrical space 353. While generally the rotary selecting division including the selecting pistons 158, 159, 161, and the upper selector rail which includes the elements 176, 174, etc., may be expected to station themselves with a high degree of accuracy in effecting the radial positioning of type wheel shaft 221 and its several integral elements, it has nevertheless been deemed advisable to provide means for centering and holding momentarily by detent action each selected position following its establishment. In like manner, it is also deemed advisable to so center and locate stunt selecting piston 222 with respect to its vertical positioning.

Towards this end, the toothed disc 356 has been provided and with it a cooperating member which comprises a comb 357 and its supporting bell crank 358. The latter is pivoted at 359 and to one of its arms is connected a tensioning spring 361. The same arm is provided with a node 362 against which the operating piston 363 presses its projection 364.

Comb 357 will be observed as comprising five centering teeth 365 between which are the spaces of sufficient width to snugly receive disc 356. Also, the thickness of the material from which comb 357 is made is such as to be snugly received between the aligning teeth of sprocket disc 356. Following each selective positioning of shaft 221, stunt selecting piston 222 and type wheel 217, which of course operate as a unit, a surge of operating fluid is supplied over conduit 366, which enters the chamber of piston 363 sending it outwardly against bell crank 358 and forcing the comb 357 against sprocket disc 356. The sides of the centering teeth 365 and those of the teeth on disc 356 are sloped sufficiently so that should there be a marginal variance from the perfect positioning of stunt selecting piston 222 and its associated elements, then the action of teeth 365 and the teeth of disc 356 will be to cam disc 356 and, therefore, stunt selecting piston 222 in both a vertical and rotational direction, if necessary, simultaneously or until such accurate positioning is attained.

*Printing*

From Fig. 4, it will be apparent that the type wheel 217 is normally maintained in comparatively close proximity to the printing platen 266. Fig. 2 shows how ink supply rollers 220 may be mounted upon spring urged brackets for maintaining the rollers in constant engagement with the surface of the type wheel 217. In this way the print characters of the type wheel are at all times maintained in condition for direct contact printing though it is feasible that a print ribbon may be used instead if for any reason such an arrangement is preferred. Printing operation is effected by moving the type wheel 217 into engagement with the platen 266 and in this manner the inked surface of a type character is impressed upon a sheet of paper in printing position surrounding the platen 266.

To afford ample flexibility to the shaft 221 so that its upper extremity may be brought into printing engagement while maintaining the lower mechanism rigid, it is preferably so constructed that its point of securement is as remote from the proximity of printing as possible, see Fig. 17a. In the instant embodiment, shaft 221 is secured to the piston 222 in any suitable manner near the lower extremity of said piston and preferably in the region occupied by disc 356. Also, there is afforded ample space as indicated 367, Figs. 3 and 17a, between shaft 221 and stunt selecting piston 222 so that the stress coincident with the printing operation may be distributed throughout the entire length of the shaft assembly unto its point of securement. Towards this end too apparatus located near the upper extremity of shaft 221 is supported pivotally and yieldably so as to be enabled to float laterally to accommodate the requirements of shaft 221. The pivot 219 of bell crank 218 is, therefore, provided with sufficient play; or, if preferred, the bell crank yoke 368 may be adequately spaced, see Fig. 5, to afford sufficient margin for the mobility of shaft 221.

Another example of floating support to accommodate shaft 221 is in the construction of the supporting hanger 369 which is pivotally carried at 371 on a spindle 372. One arm extending from the hanger 369 carries a pivot screw 373 for the grooved idler roller 374 into which is received the guide rail 375, Fig. 5, of rack bar 214. Another arm of supporting hanger 369 carries a pair of shoulder screws upon which are pivotally mounted the idler pinions 376 and 377 which mesh with rack gear 216. Between the three fixed pivots of idler pinions 376 and 377 and grooved idler roller 374, rack bar 214 is constantly maintained in mesh with rack gear 216 though the assembly is permitted to float laterally by the pivoted support of hanger 369 at pivot 371.

The print actuating piston 378, Figs. 1, 4, and 5, is carried in a housing 379 which is mounted on the plate 12. The piston nose 381 thereof urges against a node 382 of a bell crank pivoted at 383, one arm 384 of which is tensioned by a spring 385 so as to impart counterclockwise rotation to the bell crank, and its other arm 386 terminates with a split collar 387, Fig. 1. When in response to the actuation of piston 378 bell crank 384—386 is rotating counterclockwise, shaft 221 and particularly its upper extremity is flexed slightly as the type wheel 217 is brought into printing engagement with platen 266.

The operation of piston 378 and the flexing of the type wheel shaft 221 follows each type character selection. The fluid operating surge is introduced into the chamber of piston 378 over a course including a duct which traverses the bracket 388, and its integrally associated housing 379, and a conduit 389, which leads from the mounting plate 231 at fitting 391. From Fig. 3, it will be apparent that a passageway 392 continues through mounting plate 231 emerging at the orifice 393.

Orifice 393 registers with a continuation orifice 394 in jacket 229, Fig. 5, and the latter in turn communicates with the aforedescribed cylindrical space 353 receiving its operating surges collaterally to each character selection except when, as described above in connection with the letter space piston 344, one or another of the protuberances 354 cuts off fluid supply by sealing the duct 225.

Compressor

Figs. 13 to 15 illustrate an improved air compressor which is adapted to be used with a pneumatic printing device such as described in the foregoing. This unit may be driven by the same electric motor 14 utilized in driving the distributor shaft 18.

To the rear end of the motor shaft 15 is clamped an eccentric stub shaft 395, Fig. 14, which passes through the inner bushing 396 of a ball race assembly 397. The outer sleeve 398 of the ball race assembly 397 is closely fitted within a box ring 399 and the latter has secured to its side walls the compressor pistons 401 and 402 of identical construction. Box ring 399 is of sufficient depth vertically to permit sleeve 398 to ride up and down within it to an extent commensurate with the eccentricity of stub shaft 395. The horizontal motion, due to the eccentricity however, is communicated to the assembly which includes box ring 399, pistons 401, 402, and the intervening connecting blocks 403 and 404. As a result, the rotary motion of the motor shaft is converted into a reciprocatory motion for the purpose of actuating and returning the compressor pistons alternately.

The two pistons are supported in a main frame 405, Fig. 13, and on their remote extremities their chambers are sealed by means of the blocks 406 and 407 symmetrical and balanced in design. Between each block 406 or 407 and the main frame 405 is a partitioning plate 408 and the sealing gaskets 409. When a piston, as during its compression stroke, moves towards its respective block 406 or 407, the air compressed in its chamber is forced out through an opening 411 against a spring loaded disc valve 412, Fig. 15, thence down through an internal duct 413 to the connecting chamber 414 which is common to the ducts 413 of both of the end blocks 406 and 407. From the connecting chamber 414, the fluid under compression may be conducted over a supply line 415 and suitable branch line to the various apparatuses throughout the printer as described above.

During the intake stroke of a piston 401 or 402, air is obtained through an intake orifice 416, an internal duct 417, and is admitted into the piston chamber through a spring loaded disc valve 418. It is to be noted, however, that valve 412 seals against the surface of partition 408 opposite its piston chamber, whereas valve 418 seals against the surface adjacent its piston chamber. Accordingly, it will be understood that valve 412 opens during the compression stroke and seals during the intake stroke, whereas valve 418 seals during the compression stroke and opens during the intake stroke. Also, that during the time that one of the pistons is executing a compression stroke, the other of the two is executing an intake stroke and vice versa. In this way a steady air pressure is maintained in the supply vault or chamber 414.

Continuous operation of the motor during intervals when the printing mechanism may not be in operation causes the air pressure in the supply vault 414 to build up until a maximum pressure is obtained. The extent of this pressure is determined by the adjustment of a suitable pressure safety valve generally indicated 419, Fig. 15. When this pressure is sufficient to overcome the tension of spring 421, Fig. 14, and accordingly, to dislodge the sealing ball 422, excess pressure is liberated through the vent holes 423. A tension spring 424 aids in maintaining set any established position on the part of the regulating screw cap 425.

Motor speed control

In practice, it is found that the load on motor 14 may vary within relatively wide ranges so that during minimum load conditions the speed of rotation tends to increase beyond the desired rate of revolution. To prevent this condition, a collar 426 has been affixed to the end of shaft 395 whose outer periphery is concentric with the main motor shaft. A centrifugally acting weight 427 carried by a leaf spring 428 and urged inwardly by the counteracting springs 429 tends, during excessive speed operation, to be thrown outwardly. This travel on the part of weight 427 causes its perpendicularly extending arm 431 to move inwardly and in a direction towards the shaft 395 until the lobe of bell crank arm 432 follows sufficiently so that its other arm 433 may engage and break the electrical connection normally maintained by the pair of leaf contact springs 434, which are located in the motor operating circuit. This arrangement maintains a speed which is constant between predetermined limits on the part of motor 14 notwithstanding wide fluctuating characteristics of its load.

General operation

Fig. 16 illustrates diagrammatically an arrangement of pistons and fluid conduits which may assist in portraying the operation of the various elements of the pneumatic printer described in detail above. Certain liberties and conventions have been invoked in order to illucidate the disclosure, but it is to be understood that the illustrations in Fig. 16 are simplified and in some instances figurative for convenience only and that their counterpart in the other figures of the drawings represent a more precise embodiment constituting the present disclosure.

The motor 14 is continuously operated by a locally supplied current and serves to generate a fluid pressure by the alternate compressor action of its pistons 401 and 402. Air supply conducted to the common connecting vault 414 is conveyed over line 415, to the divers points whereat the supply is utilized for operating the various organs of the system. The opposite end of the motor shaft drives the gear wheel 17 imparting rotation to the start-stop shaft 18—22 in the conventional manner of start-stop permutation code systems.

Upon the reception of the start impulse, the line relay 56 becomes deenergized permitting its armature 57, Fig. 7, to rock in a clockwise direction as shuttle valve 58, under the influence of its spring, moves counterclockwise. As a result, air supply coming from the compressor and entering distributor block 63 at inlet 62 is admitted over redoubled course 68 and into the lowermost slot 73. Thereafter, this path is conducted over channel 77, exit opening 78, continuation channel 83, and arcuate moat 85. At this time, distributor plate 34, being withheld from rotation by the start-stop pawl 100, is disposed so that its bridging artery 94 is connecting arcuate moat 85 with the short arcuate start impulse moat 97. This permits the fluid surge to continue out over channels 98, 99, and 101 and into piston chamber 102 with a result that the piston 103 is moving outwardly dislodging its pawl 100 and permits distributor plate 34 to enter upon clockwise rotation, Fig. 8, in which it is influenced by driving arm 29 secured upon the driving shaft 18.

The foregoing succession of incidents occurs during the start impulse interval, but when the first selecting interval which relates to the code proper is received by relay 56, distributor plate 34 is so disposed that openings 104 and 105 thereof are in alignment with the corresponding openings of connecting duct 117 and valve chamber 123. Since piston 58 may during this interval be in either of its positions depending upon the particular signal, the succeeding fluid surge may accordingly be routed over either of the slots 73 or 75 and thereafter over either of the channels 77 or 81. For this reason, the fluid surge corresponding to the first signal impulse may be communicated to one or the other of the moats 85 or 86 and accordingly will be conducted over one of the bridging arteries 95 or 96. If the particular impulse is received directly into the chamber of the slide valve 123, it will operate to move the valve leftwardly, as viewed in Fig. 9, but if instead the impulse is received over its symmetrically opposite inlet 117, then the surge will be routed over bridging artery 128 to the opposite end of valve 135 moving it rightwardly.

The foregoing alternative courses prevail as between each of the valve chambers 123 to 127 and their symmetrically opposite selector ducts 117 to 122. The position of each valve 135 determines the path of travel between air supply entering at inlet 62 and extending into any of the central vertical ducts 143 to 147 which lead ultimately to the selector operating pistons 158 to 163.

It is to be noted at this point in the description that while the practice heretofore has been known to effect a selective fluid routing scheme by means of a permutative grouping of fluid pulsations, that in contradistinction therefrom there is here obtained an instantaneous routing of a selective operating fluid during the reception of its own signal impulse. As each impulse moves its piston 135 into one or another of the alternative positions, selector mechanism operating fluid is immediately available and operates a corresponding positioning piston 158 to 163. Also noteworthy in this connection is the arrangement whereby each piston is maintained in its said position by the continuous application of fluid pressure which results from its valve 135 maintaining a set position until, by reason of a subsequent signal, it is changed to a new setting.

The three pistons 158, 159, and 161 each control a linear movement which may be added to or withheld from a rotary operating train including the elements 172 to 176 which, through rack bar 214, rotate rack gear 216 throughout 22½° steps of angular movement to a total extent of 180°. The case shift operating piston 205 of itself effects a 180° rotation at a single stroke through the selfsame train of elements affording thereby together with pistons 158, 159, and 161 a total of 360° as has been explained above. Pistons 162 and 163 operating in a manner similar to their neighboring pistons 158, 159, and 161, effect a permutative selection for shifting the type wheel carrying shaft 221 into any of four positions through vertical movement.

With type wheel 217, which is carried on shaft 221, and remotely disposed therefrom is a selecting piston 222 having a pair of probing ducts 224 and 225, Fig. 5. Of these, duct 224 is capable of being aligned selectively with one of a plurality of orifices 248 each associated with a piston for operating a collateral function to printing sometimes referred to as a stunt selection.

Duct 225 communicates with a cylindrical space 353 except during certain instances when it is sealed by one of the protuberances 354, Figs. 3 and 18. At other times, air supplied from the source aforedescribed and entering through conduit 226 and channel 223 communicates through cylindrical space 353 with an orifice 352, transverse duct 351, etc., with the carriage return operating piston 344 as well as with a line feed operating piston 286.

Comb 357 actuated consequently to each signal selection by piston 363 constitutes a positive centering and aligning apparatus for accurately locating shaft 221 following each positioning thereof. This device 357 is so constructed and its manner of cooperation with sprocket disc 356 is so designed as to afford a means for holding stunt selecting piston 222, type wheel shaft 221, etc., for a short interval of time after a selection has been established and where, in accordance with a different timing arrangement it should be desired to obtain an overlap between the selection and setting of the type wheel shaft, comb 357 may be employed as a retaining means for holding the selector shaft in the preceding setting while a new selection is being impressed upon the setting pistons 158 to 163.

It will be understood that a mode of operation such as is herewith suggested may be employed with the present arrangement simply by regulating the period of operation of piston 363, it being noted that the torsion spring 206 on shaft 199 will serve to absorb any portion of the linear setting increment impressed upon the train 172 to 176, and that it will impart such a setting to the shaft 221 and its associated apparatus as soon as shaft 221 is released by the withdrawal of comb 357.

Noteworthy too among the features of the selector mechanism herewith disclosed is the arrangement between the setting pistons 158 to 163 and the mechanical trains 172 to 176 and 192 to 196. The disposition of each cam pin 179, 183, etc., within its elongated slots 177—178, 181—182, etc., either at the upper or lower extremities thereof maintains the adjacent links in a condition relatively secure against end play and looseness frequently encountered in aggregate motion pneumatic devices conventionally employed for this purpose.

It is to be noted that the operative movement of each selector setting piston is in a direction fundamentally perpendicular to the direction of movement of the mechanical train and that as a result, any resistances or counterforces to the action of said setting pistons is met rigidly and is not subjected against the action of the pistons in a manner that would counteract their operating force. Accordingly, it is found that the train of links 172 to 176 and 192 to 196 is maintained at all times with sufficient rigidity to preclude any possibility of incremental differences between a permutative setting impressed upon the pistons 158 to 163 and the resultant disposition of the ultimate setting member rack bar 214 in the case of the rotary setting device, and bell crank 218 in the case of the vertical setting apparatus.

While the present invention has been explained and described in contemplation of a specific embodiment, it is to be understood that numerous modifications and variations may be incorporated without departing from the underlying principles herein disclosed. Accordingly, it is intended not to be limited by any of the details illustrated in the accompanying drawings nor by the precise language contained in the foregoing specification but to be permitted instead a latitude of interpretation as indicated by the hereunto appended claims.

What is claimed is:

1. A printing telegraph machine comprising a rotatably and longitudinally shiftable type carrier, a plurality of pneumatic actuators for imparting permutatively predetermined increments of rotation to said type wheel, a plurality of pneumatic actuators operative permutatively to impart varying degrees of longitudinal shift movement to said type wheel, and an electro-responsive device operated by permutation code signals consisting of a number of impulse intervals for directing surges of operating fluid to said pneumatic actuators instantly in response to each of said signal impulses.

2. In a pneumatic apparatus, a cylinder, means for rotating said cylinder into any of several angular positions comprising a set of pneumatic actuators, means under the control of each of said actuators for contributing or diminishing a predetermined increment of angular rotation, and electro-responsive means for operating said pneumatic actuators under the control of telegraph signals.

3. In a printing apparatus, a type carrying element, a plurality of members operative componentially for moving said type carrier into each of a plurality of positions, and electro-responsive means for operating each of said members instantaneously in response to its allocated signal impulses and said several of said members sequentially in response to a series of signal impulses for moving said type carrier substantially during the time interval in which said signal impulses are communicated to said electro-responsive means.

4. Means for translating a plurality of pneumatic operations into incremental movements in a common direction, comprising a plurality of pneumatic devices operative parallelly of each other in a given direction, an objective mechanism operative in a direction perpendicular to that of said devices, and comprising a plurality of links, articulation notches between adjacent ends of said links having opposite inclinations with components in said common direction, and cam means associated with each of said pneumatic devices and presented within each set of said inclined notches.

5. In a pneumatically operated permutation setting system, an objective device to be set into any one of a plurality of different ultimate positions, a set of pneumatic actuators each capable of imparting an individual extent of movement and means connecting said actuators to render them permutably capable of imparting a cumulative movement for attaining any one of said plurality of different ultimate positions, a source of continuously available operating fluid for said pneumatic actuators, and electromagnetic means responsive instantly to a succession of electrical current pulsations for routing the operating fluid from said source to said actuators for thereby composing each of said ultimate positions during the reception period of said succession of electrical pulsations.

6. In a permutation setting system, an objective device to be set into any one of a plurality of different ultimate positions, a set of movable members each capable of imparting an individual extent of movement and means for supporting said members in an alignment so as to enable them to be moved combinedly in different permutations for imparting a plurality of differing movements to said objective device composed of different combinations of said individual extents of movement, and electromagnetic means for operating said set of members responsive instantly to a succession of electrical current pulsations for moving said members accordingly.

7. A device for selectively routing an operating fluid comprising a member defining an internal cylindrical wall surface and having a plurality of selectable routing channels with their terminal orifices presented at predetermined locations in said internal wall surface, a selecting means comprising a cylinder receivable within and having wiping engagement with said cylindrical wall surface, said cylinder having internally thereof a channel leading from a supply source and terminating with a probing duct, and signal controlled means for imparting rotation and longitudinal movement to said cylinder to bring into alignment selectively said probing duct of said cylinder and any of said terminal orifices of said routing channels.

8. In a rotationally and longitudinally movable selector head, a set of pneumatic actuators each having a translator through which it is adapted to impart to said selector head an incremental movement, means for translating said incremental movements compositely into rotational and longitudinal movement of said selector head, and an automatic device for routing signal impulses to effect the operation of said actuators permutably.

9. In type wheel printing apparatus, a type wheel, a supporting shaft therefor, selector mechanism for imparting rotational movement to said shaft including a floating rack bar movable transversely with said shaft, apparatus for imparting longitudinal movement to said shaft, and pneumatically operated means for flexing one end of said shaft transversely to effect printing engagement of said type wheel carrier by said shaft with a printing platen.

10. In a printing machine, a cylindrical type carrier, pneumatic means for positioning said carrier rotationally and axially, and electromagnetic means responsive to telegraph signals for admitting selectively surges of operating fluid from a source of supply to said pneumatic means.

11. A pneumatic selecting system comprising a main body affording a surface at which terminate a plurality of fluid conducting channels, a secondary body movable in a plurality of directions with respect to said main body and having a surface at which terminates a fluid supplying channel, said secondary body surface having wiping engagement with said main body surface, and means under the control of telegraph signals for moving said secondary body selectively in its plurality of directions.

12. An aggregate motion selector including a series of links arranged in tandem, articulation means between engaging ends of contiguous ones of said links comprising integral portions having inclined slots whose components in a direction parallel to said tandem vary progressively, and means for lengthening and shortening said arrangement of links comprising a series of members each having a cam pin presented in corresponding ones of said articulation means, and signal responsive apparatus for permutably shifting said members and their cam pins.

13. In a pneumatic distribution system, a set of routing valves each shiftable between marking and spacing positions, means affording a set of conduits for moving said valves to said marking positions, means affording a set of conduits for moving said valves to said spacing positions, a rotary distributor element affording conduits for simultaneously communicating with both of said sets of valve moving conduits, and signal responsive means for routing a fluid source to said distributor element conduits selectively.

14. In combination, a set of operating fluid routing valves, means associated with said valves for establishing courses between a set of objective channels and either ones of associated sets of fluid supply or fluid exhaust ducts, and means responsive to electric permutation code signals to shift those valves only of said set of routing valves which differ by their code characteristics from preceding code signals.

15. In a printing telegraph system, a fluid translating medium comprising a set of selecting pistons corresponding in number to the permutative components of a selected code, and a fluid routing unit for conditioning said pistons comprising a set of main arteries each communicating with one of said pistons, a plurality of sets of tributary arteries, signal impulse controlled means for establishing communication between each of said main arteries and a corresponding artery of said sets of tributary arteries, an electromagnetically supervised valve, and a rotary distribution member, said valve and said member cooperating to route fluid surges for correspondingly displacing said communication establishing means.

16. In a flexible type wheel printer, a type wheel, a fluid actuated detenting comb, a detent wheel integrally associated with said type wheel, journal means for supporting said type wheel at a point remote with respect to typing characters on said wheel, and pneumatic means for flexing said type wheel including articulation means associated with the type wheel shaft at a point adjacent the proximity of said typing characters.

17. In a pneumatic selecting system, a housing member affording an internal cylindrical wall surface and terminating ducts for a plurality of selective passage ways, a piston member receivable snugly within said housing member and having wiping engagement with said cylindrical wall surface, an artery extending through said internal member terminating with a probing duct on the surface thereof for communication with said terminating ducts, and permutation code controlled means for shifting said internal member longitudinally and rotationally to present said probing duct in various positions with respect to said internal wall surface terminating ducts.

18. A pneumatic selecting system, comprising a routing valve, a set of operating control valves, electromagnetic means for shifting said routing valve between alternative positions for accordingly directing the course of selecting fluid impulses, a rotary member including means for distributing the impulses from said alternative position courses, each over an associated set of permutation paths, said paths being arranged with corresponding paths of each set in diametric opposition about the rotary axis or rotation of said member and each pair of diametric opposite paths communicating with an associated one of a set of operating fluid control valves, a supporting body for said operating fluid control valves having therein sets of terminal ducts, each set consisting of a duct connected with a source of fluid supply, a duct connected with an avenue of fluid escape, and a duct connected with an associated selector operating piston, and means associated with said routing valves for establishing communication between said selector operating ducts and either of its associated fluid supply or escape ducts alternatively.

19. In a printing apparatus, a rotatable type wheel, a shaft carrying said type wheel axially, a supporting journal associated with said shaft remote from said type wheel, means for flexing said shaft by pressing transversely near said type wheel to produce printing engagement of said type wheel, and means for rotating said shaft to selectively present printing characters in radially alternative positions comprising a supporting member pivoted parallelly with respect to said shaft and thereon movable transversely of said shaft to conform with the flexure of said shaft, a rack, and a pinion on said shaft engaged by said rack including means for maintaining meshing engagement between said rack and pinion and thereby to communicate flexure movements of said shaft through said engagement maintaining means to said supporting member.

EDWARD E. KLEINSCHMIDT.